(12) United States Patent
Pollak et al.

(10) Patent No.: US 10,570,280 B2
(45) Date of Patent: Feb. 25, 2020

(54) SOUND HYDROPHOBIC POLYMERIC SURFACING

(71) Applicant: DUPONT SAFETY & CONSTRUCTION, INC., Wilmington, DE (US)

(72) Inventors: Keith William Pollak, Lewiston, NY (US); Timothy Scott Wyant, Cheektowaga, NY (US)

(73) Assignee: DUPONT SAFETY & CONSTRUCTION, INC., Wilmington, DE (US)

( * ) Notice: Subject to any disclaimer, the term of this patent is extended or adjusted under 35 U.S.C. 154(b) by 132 days.

(21) Appl. No.: 15/955,023

(22) Filed: Apr. 17, 2018

(65) Prior Publication Data

US 2018/0319970 A1    Nov. 8, 2018

Related U.S. Application Data

(60) Provisional application No. 62/502,808, filed on May 8, 2017.

(51) Int. Cl.
| | |
|---|---|
| *C08L 33/12* | (2006.01) |
| *C08K 3/34* | (2006.01) |
| *C09D 5/08* | (2006.01) |
| *C09D 7/40* | (2018.01) |
| *C09D 5/10* | (2006.01) |
| *C09D 133/12* | (2006.01) |
| *C09D 183/04* | (2006.01) |
| *C09D 167/06* | (2006.01) |
| *C08K 3/22* | (2006.01) |

(52) U.S. Cl.
CPC ............. *C08L 33/12* (2013.01); *C08K 3/346* (2013.01); *C09D 5/08* (2013.01); *C09D 5/10* (2013.01); *C09D 5/103* (2013.01); *C09D 7/69* (2018.01); *C09D 133/12* (2013.01); *C09D 167/06* (2013.01); *C09D 183/04* (2013.01); *C08K 2003/2227* (2013.01); *C08L 2205/03* (2013.01)

(58) Field of Classification Search
USPC ......................................................... 523/209
See application file for complete search history.

(56) References Cited

U.S. PATENT DOCUMENTS 3,847,865 A    11/1974 Duggins

FOREIGN PATENT DOCUMENTS

| CN | 105462419 A | 4/2016 |
|---|---|---|
| EP | 689908 A1 | 1/1996 |
| JP | 4375184 B2 | 2/2009 |

OTHER PUBLICATIONS

Database WPI Week 201653 Thomson Scientific, London, GB; AN 2016-22047H XP002781524, & CN 105 462 419 a (Tongling Side Sci & Technology Co Ltd) Apr. 6, 2016 (Apr. 6, 2016) abstract.
International Search Report dated Jun. 13, 2018, for PCT/US2018/026385 filed Apr. 6, 2018. ISA/EPO, Authorized officer Pellegrini, Paolo.

*Primary Examiner* — Terressa Boykin

(57) ABSTRACT

A solid surface comprises (i) from 45 to 80 volume fraction percent of polymethylmethacrylate or unsaturated polyester or a combination of both, (ii) from 25 to 55 volume fraction percent of inorganic filler particles distributed evenly throughout the solid surface, and (iii) from 0.75 to 8 volume fraction percent of a siloxane fluid, wherein, when the filler has a major dimension of from 30-50 micrometers, the siloxane has a molecular weight of from 40,000 to 150,000 or when the filler has a major dimension of from 10-15 micrometers, the siloxane has a molecular weight of from 25,000 to 100,000 or when or when the filler has a major dimension of from 1-10 micrometers, the siloxane has a molecular weight of from 5,000 to 100,000.

7 Claims, No Drawings

SOUND HYDROPHOBIC POLYMERIC SURFACING

BACKGROUND

1. Field of the Invention

This invention pertains to hydrophobic solid surfacing that is useful for homes, medical buildings, hotels and restaurants.

2. Description of Related Art

Prior art describes technologies that impart hydrophobic performance only superficially on solid surfacing materials. These technologies are typically applied to the fabricated materials as a coating on the surface of the solid material. Often the coatings need to be reapplied as they are susceptible to being worn away.

European patent application publication EP 689908 A1 describes a process for protecting wood, marble, stones, bricks, plaster, cement and similar materials, used in particular in building, from the degradation caused by atmospheric and polluting agents, by applying on the surface of said materials a protective agent selected from aqueous dispersions of fluorinated polyurethanes, the fluorinated part deriving from fluoropolyether units, having high number average molecular weight, at least 9000, and having a fluorine content higher than 25% by weight and containing in their structure hydrophilic ionic groups of cationic or anionic nature, wherein the cationic or anionic groups are present as side groups with respect to the polyurethane polymeric chain.

Japanese patent number JP 4375184 B2 discloses a solution for easy removal of soiling stuck on artificial marble by providing an acrylic urethane based coating material containing a siloxane based water repellent agent as a water repellent component on the artificial marble, the marble further comprising a synthetic resin and inorganic filler.

There remains an ongoing need to provide solid surfaces that exhibit the hydrophobic technology throughout the bulk of the material. With the technology inherent to the material, the fabricator is saved the coating step, and the performance lasts.

SUMMARY OF THE INVENTION

This invention pertains to a solid surface comprising (i) from 45 to 80 volume fraction percent of polymethylmethacrylate or unsaturated polyester or a combination of both, (ii) from 25 to 55 volume fraction percent of inorganic filler particles distributed evenly throughout the solid surface, and (iii) from 0.75 to 8 volume fraction percent of a siloxane fluid wherein, when the filler has a major dimension of from 30-50 micrometers, the siloxane has a molecular weight of from 40,000 to 150,000 or when the filler has a major dimension of from 10-15 micrometers, the siloxane has a molecular weight of from 25,000 to 100,000 or when or when the filler has a major dimension of from 1-10 micrometers, the siloxane has a molecular weight of from 5,000 to 100,000.

DETAILED DESCRIPTION

Solid Surface

By solid surface is meant a three-dimensional non-flexible rigid surface. Typically, a solid surface comprises (i) from 45 to 80 volume fraction percent of organic polymer resin such as polymethylmethacrylate or unsaturated polyester and (ii) from 25 to 55 volume fraction percent of inorganic filler particles distributed evenly throughout the solid surface.

Organic Polymer Resin

One of the most common organic polymer resins is polymethylmethacrylate (PMMA) polymer or "acrylic" copolymer. Preferably, the polymethylmethacrylate is present in an amount from 45 to 80 volume fraction percent.

The polymethylmethacrylate (PMMA) arises from polymerization of an acrylic composition. The preparation of a polymerizable acrylic composition typically involves a syrup containing methyl methacrylate polymer dissolved in monomeric methyl methacrylate (MMA) also known as polymer-in-monomer syrup, a polymerization initiator, and an inorganic filler. Such a composition and method of making is disclosed in U.S. Pat. No. 3,847,865 to Duggins. The composition can be cast or molded and cured to produce a sheet structure with an important combination of properties including translucency, weather resistance, resistance to staining by common household materials, flame resistance, and resistance to stress cracking. In addition, the cured article can be easily machined by conventional techniques including sawing and sanding. This particular combination of properties makes such a structure particularly useful as kitchen or bathroom countertops, back splash panels, molded articles such as towel racks, and the like. The MMA polymer constituent may further comprise methyl methacrylate homopolymers and copolymers of methyl methacrylate with other ethylenically unsaturated compounds (e.g., vinyl acetate, styrene, alkyl acrylates, acrylonitrile, alkyl methacrylates, multifunctional acrylic monomers such as alkylene dimethacrylates and alkylene diacrylates). In addition, the polymer constituent can contain small amounts of other polymers including minor amounts of polyester.

An amount of non-polymerized MMA may remain in the solid surface in an amount which may be as much as 1.0 volume fraction percent.

Another common organic polymer resin is unsaturated polyester (UPE). UPE resins are comprised of polyester polymers or copolymers that incorporate covalently bound unsaturation, like a carbon-carbon double bond, dissolved in polymerizable styrenic monomers, like styrene.

Preferably, the UPE is present in an amount from 45 to 80 volume fraction percent.

Either resin composition can be cast or molded and cured to produce a sheet structure with an important combination of properties including translucency, weather resistance, resistance to staining by common household materials, flame resistance, and resistance to stress cracking. In addition, the cured article can be easily machined by conventional techniques including sawing and sanding. This particular combination of properties makes such a structure particularly useful as kitchen or bathroom countertops, back splash panels, wall cladding, molded articles such as towel racks, and the like.

The organic polymer resins described above are typically crosslinked, creating a polymeric network referred to as a thermoset. Key properties of thermosets are strength retention at elevated temperatures and dimensional stability over time while subject to a variety of environmental conditions. Such properties make solid surface products desirable in homes and other buildings.

In some embodiments, the polymer may be a combination of PMMA and UPE. Preferably, the combination of resins is present in an amount from 45 to 80 volume fraction percent.

Inorganic Filler

By "filler" is meant any material that is solid at room temperature and atmospheric pressure, used alone or in combination, which does not react chemically with the various ingredients of the composition and which is insoluble in these ingredients, even when these ingredients are raised to a temperature above room temperature and in particular to their softening point or their melting point. A preferred filler is an inorganic filler which is distributed evenly throughout the solid surface.

Preferably, the filler is present in an amount from about 25 to 55 volume fraction percent.

In one embodiment, the filler is present in the form of small particles, with an average particle size, or major dimension, in the range of from about 30-50 micrometers or from 10-15 micrometers or even from 1-10 micrometers.

In one embodiment, the inorganic filler particle is alumina trihydrate (ATH). A calcined ATH prepared by a thermal treatment process to remove water is particularly suitable.

In other embodiments, the inorganic filler particle is alumina, talc or quartz.

In another embodiment, the filler is micronized organic polymers like polyether ether ketone or polytetrafluoroethylene.

The filler particles are distributed evenly throughout the solid surface, that is to say their distribution throughout the bulk of the solid surface material is uniform. They are not present only as a surfacing layer.

Siloxane Fluid

A suitable siloxane fluid is a siloxane polymer with hydrocarbon substituents such as polydimethylsiloxane (PDMS). In one embodiment, the PDMS is methyl-terminated polydimethylylsiloxane which is available from manufacturers like Dow Corning Corporation, Shin-Etsu Chemical Company, Gelest Inc. or Siltech Corporation.

When the filler has a major dimension of from 30-50 micrometers, it is preferable that the siloxane has a molecular weight of from 40,000 to 150,000. When the filler has a major dimension of from 10-15 micrometers it is preferable that the siloxane has a molecular weight of from 25,000 to 100,000 or when or when the filler has a major dimension of from 1-10 micrometers, it is preferable that the siloxane has a molecular weight of from 5,000 to 100,000.

Method of Making a Solid Surface

A solid surface, that is renewable, can be made by the steps of (i) providing an uncured polymeric composition comprising
  (a) from 0 to 15 volume fraction percent of PMMA,
  (b) from 10 to 40 volume fraction percent of MMA,
  (c) from 25 to 55 volume fraction percent of inorganic filler particles, and
  (d) from 0.75 to 8 volume fraction percent of a siloxane fluid wherein, when the filler has a major dimension of from 30-50 micrometers, the siloxane has a molecular weight of from 40,000 to 150,000 or when the filler has a major dimension of from 10-15 micrometers, the siloxane has a molecular weight of from 25,000 to 100,000 or when or when the filler has a major dimension of from 1-10 micrometers, the siloxane has a molecular weight of from 5,000 to 100,000 and
  (e) from 0.1 to 2 volume fraction percent of a curing agent.

(ii) pouring the composition of step (i) into molding receptacle, and (iii) curing the composition at a temperature of from ambient to 80 degrees C. for between 3 and 60 minutes to solidify the composition to form a solid surface.

An unsaturated polyester or acrylic-modified polyester solid surface, that is renewable, can also be made by the steps of (i) providing an uncured polymeric composition comprising
  (a) from 10 to 40 volume fraction percent unsaturated polyester,
  (b) 5 to 25 volume fraction percent of monomer wherein
    a. 100% of the monomer is styrene or
    b. The monomer is a blend of styrene and methyl methacrylate at any ratio.
  (c) from 1 to 55 volume fraction percent of inorganic filler particles modified with discrete functional particles that are bound, or adhered to the filler particles, the filler particles being distributed evenly throughout the solid surface wherein at least 95 volume fraction percent of the filler particles has a major dimension in the range of from 0.5 to no greater than 10 microns or from 1 to no greater than 5 microns or from 1 to no greater than 2 microns,
  (d) from 0.75 to 8 volume fraction percent of a siloxane fluid wherein, when the filler has a major dimension of from 30-50 micrometers, the siloxane has a molecular weight of from 40,000 to 150,000 or when the filler has a major dimension of from 10-15 micrometers, the siloxane has a molecular weight of from 25,000 to 100,000 or when or when the filler has a major dimension of from 1-10 micrometers, the siloxane has a molecular weight of from 5,000 to 100,000 and
  (e) from 0.1 to 2 volume fraction percent of a curing agent.

(ii) pouring the composition of step (i) into molding receptacle, and (iii) curing the composition at a temperature of from ambient to 80 degrees C. for between 3 and 60 minutes to solidify the composition to form a solid surface.

Other Components of the Solid Surface

The surface may further comprise additional components such as a pigment, decorative particulates, a coupling agent or a crosslinker.

The term "pigment" means a colorant that is insoluble in the medium in which it is used, and therefore of a particulate nature encompassing the physical and chemical properties thereof (e.g. surface charge and topology). The amount of pigment present is that quantity sufficient to provide the desired color effect but is typically from 0.05 to 2.50 volume fraction percent. The pigments may be organic or inorganic pigments.

Optionally, the solid surface material may also contain macroscopic decorative particles known to the industry as "crunchies". Crunchies are various filled and unfilled, pigmented or dyed, insoluble or crosslinked chips of polymers such as ABS resins, cellulose esters, cellulose ethers, epoxy resins, polyethylene, ethylene copolymers, melamine resins, phenolic resins, polyacetals, polyacrylics, polydienes, polyesters, polyisobutylenes, polypropylenes, polystyrenes, urea/formaldehyde resins, polyureas, polyurethanes, polyvinyl chloride, polyvinylidene chloride, polyvinyl esters and the like. Other useful macroscopic translucent and transparent decorative particles are natural or synthetic minerals or materials such as agate, alabaster, albite, calcite, chalcedony, chert, feldspar, flint quartz, glass, malachite, marble, mica, obsidian, opal, quartz, quartzite, rock gypsum, sand, silica, travertine, wollastonite and the like; cloth, natural and synthetic fibers; and pieces of metal.

A coupling agent enhances performance properties. Suitable coupling agents for use in this invention are functionalized (meth)acrylic esters such as phosphoric acid 2-hydroxyethyl methacrylate ester and 3-(trimethoxysilyl)propyl methacrylate. These are typically present in an amount of less than 1 volume fraction percent. The coupling agent can be either added to the reactive mixture or pre-applied to the filler surface. The coupling agent comonomer will copolymerize with the resin and bond to the filler surface.

A pigment and coupling agent may be used alone or in combination.

Comonomers are often incorporated into the organic polymer resin to modify performance properties of the solid surface material. One common example is n-butyl acrylate added to acrylic resin for enhancing the thermal stability of the solid surface material. Comonomers are typically present in an amount of less than 2 volume fraction percent.

In some embodiments, the solid surface may also comprise a crosslinker. A crosslinker enhances the integrity of the article at elevated temperatures. Suitable crosslinkers for use in this invention are polyfunctional (meth)acrylic esters such as ethylene glycol dimethacrylate and trimethylolpropane trimethacrylate.

A solid surface comprising PMMA, ATH and a siloxane fluid is hydrophobic and repels lime scale which is polar and hydrophilic.

EXAMPLES

The following examples are given to illustrate the invention and should not be interpreted as limiting it in any way. Examples prepared according to the process or processes of the current invention are indicated by numerical values. Control or Comparative Examples are indicated by letters.

The formulations in the examples were prepared using the following general procedure. Methylmethacrylate, crosslinker, adhesion promoting comonomer, pigments, peroxide, polymethylmethacrylate, and alumina trihydrate are mixed in a reaction kettle;. To a reaction kettle, a reactive, organic resin is prepared. In cases of acrylic products, typical reactive resins are comprised of methylmethacrylate, methacrylate-functionalized crosslinker, adhesion promoting comonomer, pigments, peroxide, and polymethylmethacrylate. Optionally, a cure rate accelerant might be included. In the cases of unsaturated polyester or acrylic modified unsaturated polyester, typical reactive resins are comprised of an unsaturated polyester polymer, styrene, peroxide, and cure rate accelerants. Optionally, an acrylic polymer or copolymer might be included. Once the organic compounds are homogenized and the mineral compounds well dispersed, the mixture is placed under vacuum. After the mixture is degassed, the peroxide accelerator is added to the stirring mix. Then the activated mix is cast into an insulated mold where the reactive mix is cured and solidified.

Comparative Example 1

The reaction product resulting in a composite comprised of 44.5 volume percent Alumina Trihydrate (WH311, 40 micron mean particle diameter, Alcan), 55.5 volume percent thermoset acrylic, and less than 1 volume percent white pigment ($TiO_2$).

Comparative Example 2

The reaction product resulting in a composite comprised of 44.5 volume percent Alumina Trihydrate (WH311, 40 micron mean particle diameter, Alcan), 55.5 volume percent unsaturated polyester resin (UPE resin from Ashland or Reichold), and less than 1 volume percent white pigment ($TiO_2$).

Example 1

The reaction product resulting in a composite comprised of 44.5 volume percent Alumina Trihydrate (WH311, 40 micron mean particle diameter, Alcan), 3.4 volume percent PDMS (Xiameter PMX200, Dow Corning), 52.1 volume percent thermoset acrylic, and less than 1 volume percent white pigment ($TiO_2$).

Example 2

The reaction product resulting in a composite comprised of 44.5 volume percent Alumina Trihydrate (WH311, 40 micron mean particle diameter, Alcan), 3.4 volume percent PDMS (Xiameter PMX200, Dow Corning), 52.1 volume percent unsaturated polyester resin (UPE resin from Ashland or Reichold), and less than 1 volume percent white pigment ($TiO_2$).

What is claimed is:
1. A solid surface comprising
   (i) from 45 to 80 volume fraction percent of polymethylmethacrylate or unsaturated polyester or a combination of both,
   (ii) from 25 to 55 volume fraction percent of inorganic filler particles distributed evenly throughout the solid surface, and
   (iii) from 0.75 to 8 volume fraction percent of a siloxane fluid wherein, when the filler has a major dimension of from 30-50 micrometers, the siloxane has a molecular weight of from 40,000 to 150,000 or when the filler has a major dimension of from 10-15 micrometers, the siloxane has a molecular weight of from 25,000 to 100,000 or when or when the filler has a major dimension of from 1-10 micrometers, the siloxane has a molecular weight of from 5,000 to 100,000.
2. The surface of claim 1 wherein the filler is alumina trihydrate, alumina, talc, quartz or a micronized polymer.
3. The surface of claim 1 wherein the siloxane fluid is a siloxane polymer with hydrocarbon substituents.
4. The surface of claim 1 wherein the siloxane fluid is coated onto the surface of the filler.
5. The surface of claim 1 further comprising either alone or in combination, a pigment, a coupling agent or a crosslinker.
6. The surface of claim 3 wherein the siloxane polymer is polydimethylylsiloxane.
7. The surface of claim 6 wherein the polydimethylylsiloxane is methyl-terminated polydimethylylsiloxane.

* * * * *